Jan. 23, 1968  D. SCIAKY  3,365,091
VACUUM CHAMBER

Filed Oct. 30, 1964  4 Sheets-Sheet 1

INVENTOR.
David Sciaky
BY

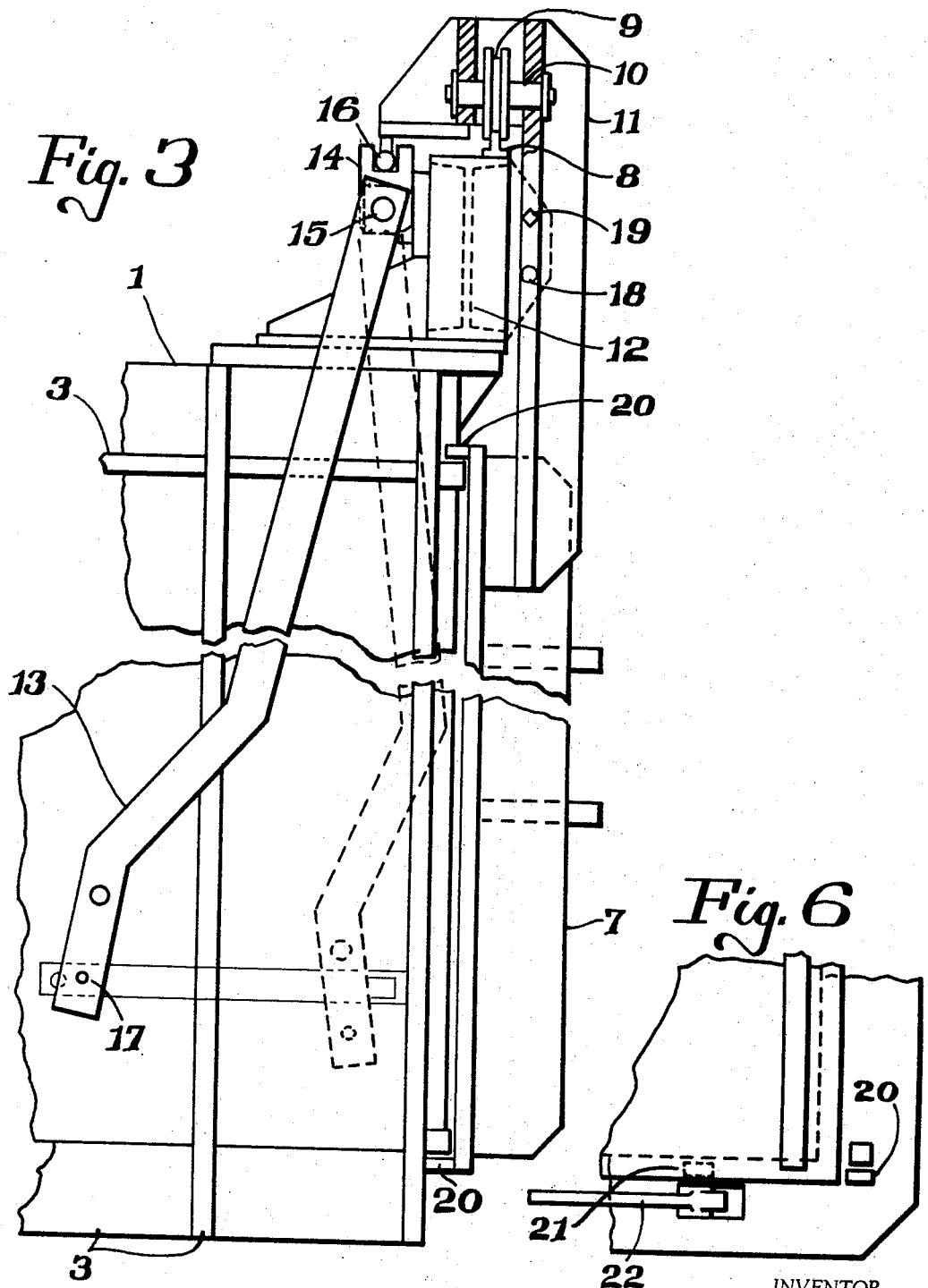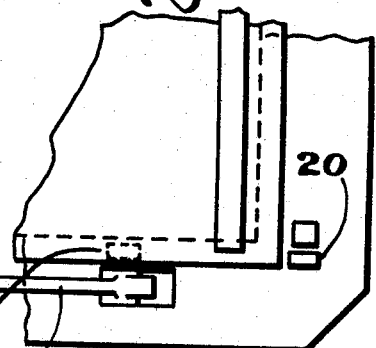

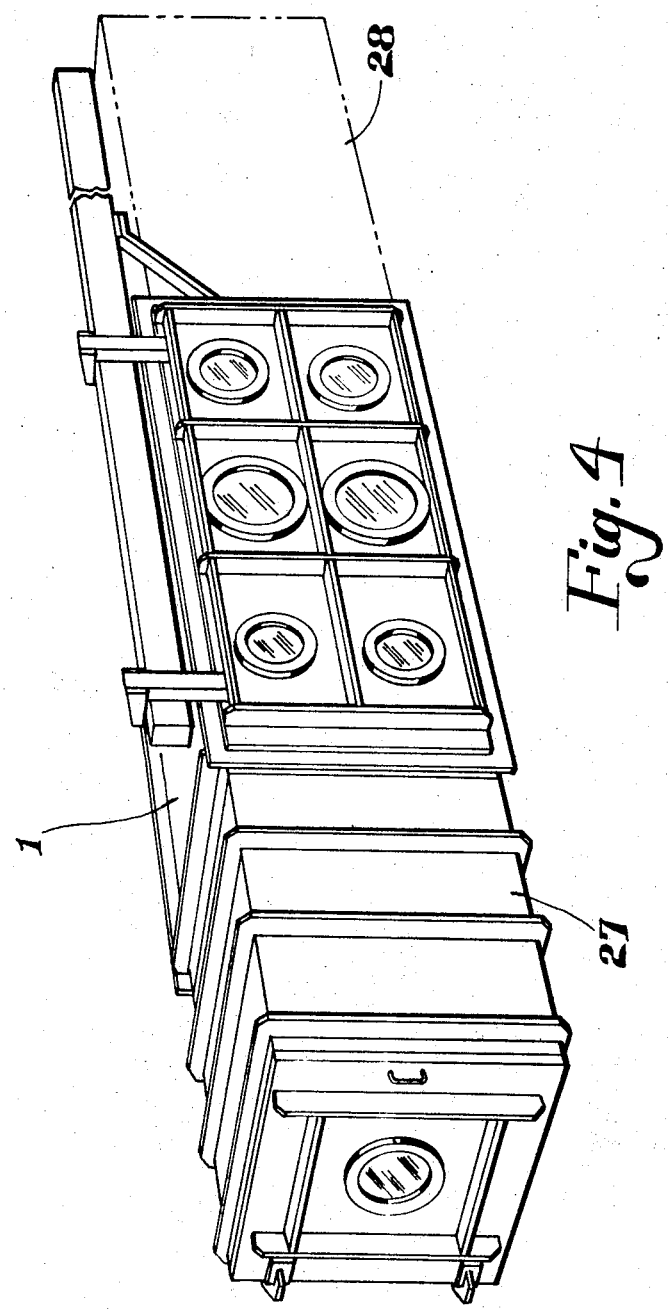

United States Patent Office 3,365,091
Patented Jan. 23, 1968

3,365,091
VACUUM CHAMBER
David Sciaky, Chicago, Ill., assignor to Welding Research, Inc., Chicago, Ill., a corporation of Illinois
Filed Oct. 30, 1964, Ser. No. 407,799
9 Claims. (Cl. 220—4)

ABSTRACT OF THE DISCLOSURE

This invention refers to vacuum chambers of parallelopiped shape, for use in electron beam welding machines, which allow full and free access to the interior of the chamber from three sides, including sealing means for keeping air from entering the chamber and a baffle arrangement for absorbing X-rays produced within the chamber during electron beam welding operation. Means for reducing chamber distortion and a novel sealed sliding door and operator are included.

This invention relates to electron beam welding machines and in particular to vacuum chambers in which the electron beam welding process is carried out. For reference, see my previous patent application No. 109,575, filed May 12, 1961, entitled, Electron Gun, now Patent No. 3,187,216 which describes the process.

Heretofore, in vacuum technology the vacuum chambers have usually taken the form of cylinders with the cylinder axis in the vertical or in the horizontal plane. Doors for access to the interior of the cylindrical vacuum chamber have been provided, usually at one end of the cylinder with the pumping apparatus fitted to the opposite end of the cylinder. In electron beam welding it is necessary to provide a relative motion between the parts being welded and the electron gun. When using cylindrical chambers it has been found that the available space within the chamber is not used in a very efficient manner inasmuch as it is not possible to move the gun a distance equal to the diameter of the cylinder because of interference of the moving part with the inside wall of the cylinder when motion is required along a line parallel to a diameter but at a point intermediate between the center of the cylinder and the outer wall. For example, in a practical case, a cylinder of 40" dia. is required in order to provide a working motion of 20" for the gun. The object of this invention is to provide a vacuum chamber in which most of the available space within the chamber is useful in the electron beam welding operation.

Another object of this invention is to provide a vacuum chamber which has a multiplicity of doors and which allows free access to the interior of the chamber in order that the work pieces may be installed and positioned within the chamber with relative ease.

Another object of this invention is to provide a sliding type door for gaining entry to the inside of the vacuum chamber.

Another object of this invention is to provide a sliding type door which has installed in it a sealing means for preventing leakage of the air into the chamber.

Another object of this invention is to provide a sliding door which incorporates means for preventing the passage of X-rays normally generated inside the vacuum chamber during the electron beam welding process from passing across the sealing surfaces into the area surrounding the vacuum chamber.

Another object of the invention is to provide a vacuum chamber of open construction in which deflections along the sealing surfaces are kept to a minimum so as to insure proper sealing.

Another object of this invention is to provide a mechanism for the sliding door which is easily operable and requires a minimum of effort.

Another object of the invention is to provide a sliding door mechanism which can be readily mechanized.

Figure 1:
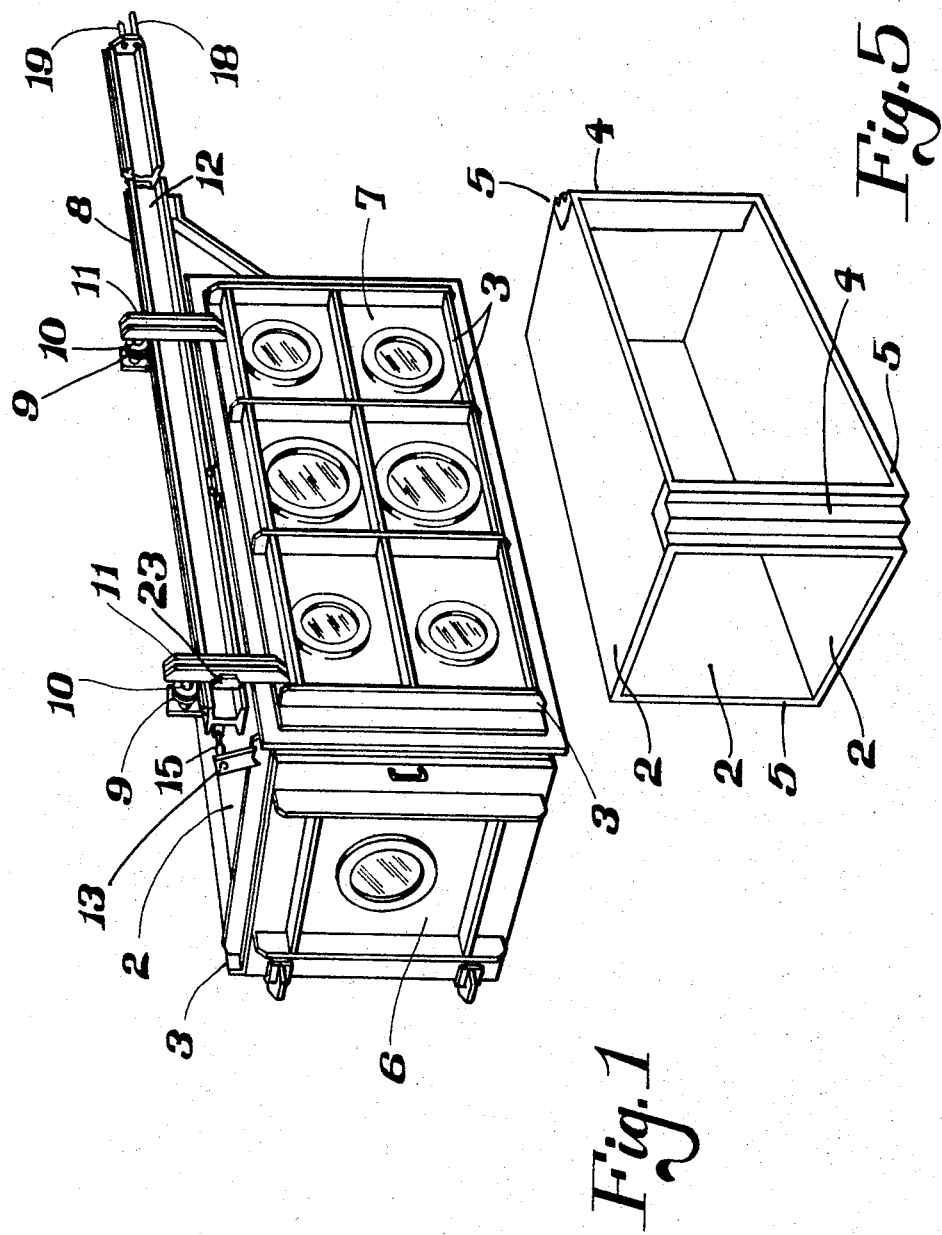
Figure 2:
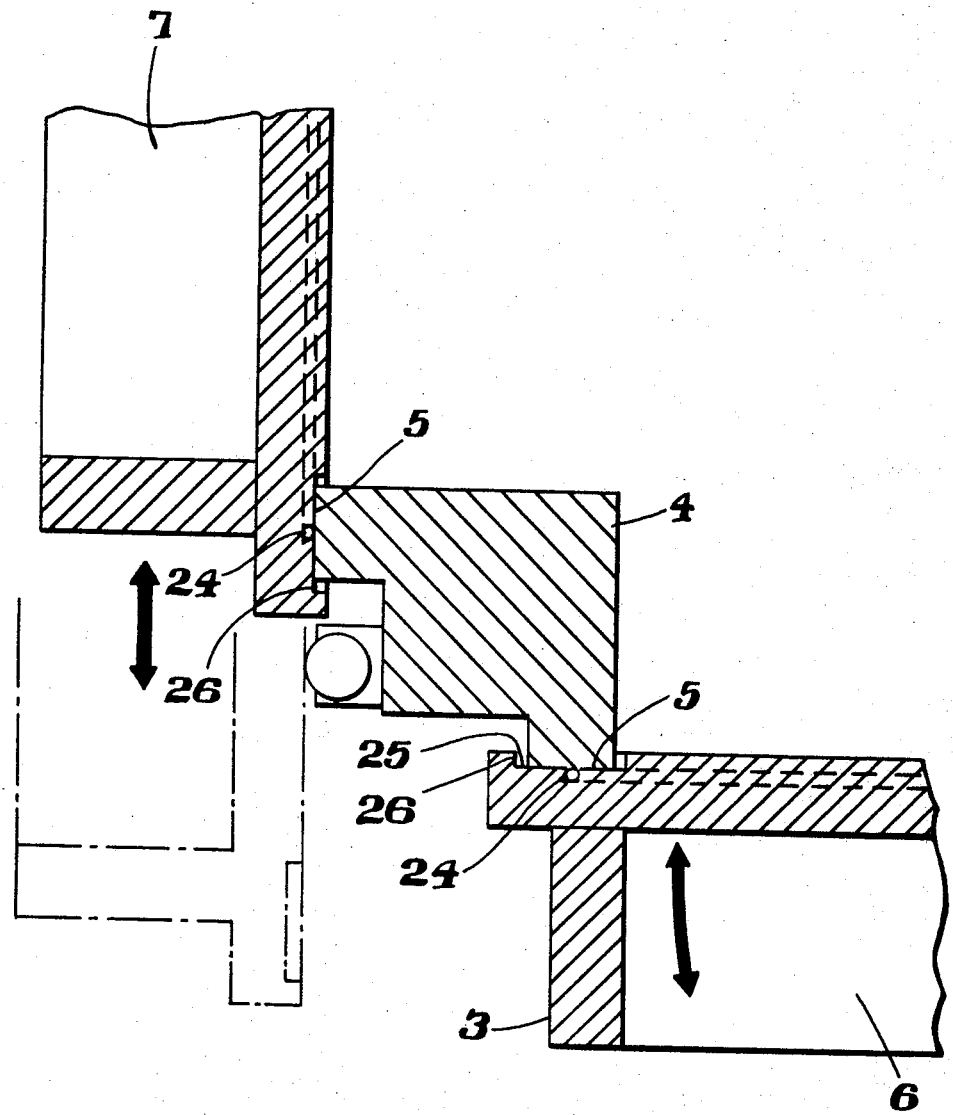

For a better understanding of the invention reference should be made to the accompanying drawings. FIG. 1 is a drawing of a vacuum chamber made in accordance with the teachings of the present invention. FIG. 2 is a section showing a detail of the X-ray barrier and vacuum sealing device. FIG. 3 is a detail of the sliding door operating mechanism. FIG. 4 is an illustration of a method whereby the vacuum chamber may easily be extended by the addition of auxiliary chambers at either end of the basic chamber. FIG. 5 is a view showing the basic structure of the chamber. FIG. 6 is a detail of the cam roller arrangement used in conjunction with the sliding door.

Referring to FIGS. 1 and 5, the vacuum chamber 1 is constructed of large rectangular plates 2 and stiffeners 3 in order to provide a rigid structure which will not deflect under the force of the air surrounding the chamber. Corner columns 4 provide stiff supports for the top and bottom plates of the vacuum chamber. These columns are machined to the shape shown and the surfaces 5 machined and polished so as to provide three separate sealing surfaces. The stiffening members 3 insure that there will be little deflection along the top and bottom sealing surfaces under the load imposed by the air pressure when the chamber has been evacuated.

Hinged doors are provided at the right and left sides of the chamber. These doors carry O-ring seals which effectively seal against sealing surface 5 from leakage of air into the chamber. Across the front of the chamber is provided sliding door 7 which also carries O-ring sealing means. As shown on FIG. 3, sliding door 7 is supported by track 8 which is rigidly attached to the vacuum chamber. The door is fitted with flanged rollers 9 and shafts 10 carried on supports 11. The shaft 10 bears a fixed relationship to the door whereas flanged roller 9 is free to slide along the shaft 10. The flanged rollers 9 roll on a track 8 supported on I-beam 12 which is fixed to the chamber. Lever 13 carrying a fork assembly 14 is fixed to a rod 15 which extends the length of the front of the chamber. By moving the lever arm towards the back of the chamber the door is moved away from the opening at the front of the chamber. This is done inasmuch as the track 8 is fixed to the chamber and a force is applied through the lever action against pin 16 which causes the shaft 10 to slide within roller 9, the door therefore moving outward away from the chamber. A pin is provided so that at the end of the travel of lever 13 the lever may be locked in position by passing a pin through hole 17 and locking the lever to the chamber wall. The door being now separated from the sealing surface may be moved towards the right along the track, it being necessary only to overcome the rolling friction between wheel 9 and the shaft 10 and the track 8. At the end of the travel a pneumatic shock absorber 18 and a positive adjustable mechanical stop 19 are provided. Rollers 20 are provided at the top and bottom of the righthand stiffener in order to support the door away from the sealing surfaces during the travel. As shown in FIG. 6 roller 21 with eccentric operator 22 is provided to push the bottom of the door at the lower righthand corner of the door so it eases on to the rollers 20. While the door is being moved the O-ring seals are prevented from rubbing against the sealing surfaces through the action of these rollers. In order to close the chamber the door is pulled to the left until it reaches the adjustable mechanical stop 23 located at the upper lefthand corner of track support. The pin is removed and the lever moved toward the front of the chamber, thus sliding the door toward the sealing surfaces. The vacuum pumps may then be energized and the action of the air pressure on the outside of the chamber will cause effective sealing of the doors to the chamber.

For very large installations it could be readily seen that the operating lever could be operated pneumatically and that the door could be driven by means of a motor coupled to the roller upon which the door is suspended. In installing a machine of this type it is of course understood that the machine be mounted so that the track is level so that when closing or operating the door it will not be necessary to do any lifting of the door. To this end the track supporting structure is so designed that it does not deflect appreciably under the load of the door.

FIG. 2 is a section of the door, which illustrates the method of holding the O-ring seal and the form of the X-ray barrier. The seals 24 represent the O-ring seal retained in a groove which is machined in the door. Pocket 25 into which the sealing surface 5 nests is milled into the door as shown in order to provide a barrier for X-rays which would otherwise be able to pass between the sealing surfaces to the surruonding environment. Any X-ray which may pass along the sealing surface 5 would find a barrier at surface 26 which it can not pass.

In FIG. 4 the chamber is shown with the side doors removed from their hinges and auxiliary chambers 27 and 28 brought up to the sealing surfaces 5. O-ring seals are provided on the auxiliary extension chamber. The hinged doors are hung on the auxiliary chambers and are used to provide access to the chamber. The basic chamber 1 and auxiliary chambers are bolted together and are maintained in mechanical relationship with one another by means of suitable guide pins.

Auxiliary pumping equipment may be made a part of the extensions in order that the pump-down time not become too excessive.

The invention is not to be limited to or by details of construction of the particular embodiment thereof illustrated by the drawings, as various other forms of the device will, of course, be apparent to those skilled in the art without departing from the spirit of the invention or the scope of the claim.

What is claimed is:

1. In a vacuum chamber fabricated by welding rectangular metal plates and corner column structural members into a parallelopiped shape, a first of said metal plates of rectangular shape for forming the top of said vacuum chamber, a second rectangular plate for forming the back of said vacuum chamber, welded along one of its edges to an edge of equal length on the aforesaid first plate and at right angle to it, a third rectangular plate equal in size to the said first plate welded at its edge to the edge opposite the already welded edge of the said second plate, and at right angle to it so as to form a C-shaped structure, the aforesaid corner columns welded between the respective open, facing corners of said C-shaped structure so as to form an opening across the front and at both ends of said structure; the ends of the plates and corner columns at the three openings being machined so as to form a smooth, unbroken sealing surface at each opening, doors mounted at aforesaid openings for sealing aforesaid vacuum chamber, and pumping means communicating to inside of chamber through an opening in one or more of the above plates for reducing the pressure within the chamber below the atmospheric pressure.

2. In a vacuum chamber as in claim 1, a slideable door for closing one of said openings and hinged doors mounted on said vacuum chamber for closing the two end openings, said doors formed with a continuous recess close to their periphery into which the aforementioned sealing surfaces may nest when the door is closed, a continuous retaining groove for resilient sealing means formed at the bottom of the first mentioned recess and an array of stiffening members welded to the outside of said doors.

3. In a vacuum chamber as is claim 1, in which stiffening members in the form of metal plates of rectangular cross section are welded, along their length and at their narrow edge, perpendicularly to the outer surface of the three plates forming the C-type structure along lines running parallel to the sealing edges of the chamber.

4. In a vacuum chamber as in claim 3, in which stiffening members of rectangular section are welded perpendicular to the outside of the three aforementioned plates, along a line parallel and adjacent to each of the sealing surfaces.

5. In a vacuum chamber having access from three sides, auxiliary chambers formed with two openings having the same cross sectional dimensions as the openings in the aforementioned chamber, said auxiliary chambers provided with a groove and resilient sealing means at each opening, means for pinning and means for fastening the auxiliary chambers to the first mentioned chamber so that all are retained in mechanical alignment.

6. In a vacuum chamber of parallelopiped shaped having openings on three sides for access to the interior and three access doors for sealing said chamber openings, a track mounted parallel to, behind, and above the top edge of one of the chamber openings and extending a distance at least equal to twice the width of the opening, a door arranged to seal said opening including means for moving said door along a path at right angles to the plane of said door so as to break the seal, and roller means mounted on said door cooperating with said track for rolling said door along said track.

7. In a vacuum chamber as in claim 6, in which the first means for moving the said door comprises a shaft having two ends, bearings supporting said shaft so that it is held parallel to, below, and behind the aforementioned track, and extends the full width of the chamber, a lever arm fastened to the shaft at or near one end of said shaft, a fork welded to and extending above the said shaft at or near said end of the shaft so that said fork can describe an arc when lever arm is moved so as to describe an arc about the bearings, a suspension hanger support (11) mounted to the top and at one end of said door including a roller wheel slideable upon a second shaft which is mounted on the hanger support above the door with its axis at right angles to the door, and a pin mounted upon rear of said hanger support arranged so as to engage said fork when door is slid in front of the opening, a second hanger support mounted at the opposite end of said door, a second fork mounted at a point along the said first shaft behind said second hanger support when door is in its closed position. A third pin mounted upon rear of second hanger support and arranged so as to engage said second fork when door is slid in front of opening so that when the lever arm is rotated about its bearings, the second and third shafts and their respective hanger supports and the door will move in a direction perpendicular to the plane of the door.

8. In a vacuum chamber as in claim 7 including resilient means to absorb the chock at the end of the travel of the door and adjustable means for limiting the open and closed position of the door.

9. In a vacuum chamber as in claim 8 including rollers mounted, so as to roll about a vertical axis, to the chamber at the top and bottom and outside of the end of the chamber which the door crosses when it is slid to open the chamber, the said rollers being in contact with the inner face of the door at a point close to the top and bottom edges of the door.

References Cited

UNITED STATES PATENTS

| | | | |
|---|---|---|---|
| 115,127 | 3/1871 | Snyder et al. | 220—46 |
| 563,008 | 6/1896 | Bennett | 49—222 |
| 685,765 | 11/1901 | Jacobs | 220—41 |
| 1,181,907 | 5/1916 | Long. | |
| 1,210,436 | 1/1917 | Dyblie | 220—41 |
| 2,330,220 | 9/1943 | Kemper | 220—41 |
| 2,370,660 | 3/1945 | Heineman | 220—41 |
| 2,675,940 | 4/1954 | Schmitz | 220—71 |
| 2,681,166 | 6/1954 | Scofield | 220—4 |
| 2,761,581 | 9/1956 | Cohee | 220—4 |
| 3,182,846 | 5/1965 | Lakaff | 220—4 |
| 3,189,390 | 6/1965 | Elliott | 220—41 |

FOREIGN PATENTS 610,982   6/1926   France.

THERON E. CONDON, *Primary Examiner.*

JAMES R. GARRETT, *Examiner.*